United States Patent
Shannon et al.

(10) Patent No.: US 10,464,577 B1
(45) Date of Patent: Nov. 5, 2019

(54) CONTEXTUAL AUTONOMOUS VEHICLE SUPPORT THROUGH WRITTEN INTERACTION

(71) Applicant: GM GLOBAL TECHNOLOGY OPERATIONS LLC, Detroit, MI (US)

(72) Inventors: Jacqueline Mary Shannon, San Francisco, CA (US); Stephanie Olivia Engle, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/192,174

(22) Filed: Nov. 15, 2018

(51) Int. Cl.
  *B60Q 1/00* (2006.01)
  *B60W 50/14* (2012.01)
  *B60K 35/00* (2006.01)
  *G05D 1/00* (2006.01)

(52) U.S. Cl.
  CPC .......... *B60W 50/14* (2013.01); *B60K 35/00* (2013.01); *G05D 1/0088* (2013.01); *B60K 2370/1438* (2019.05); *B60K 2370/152* (2019.05); *B60W 2050/146* (2013.01)

(58) Field of Classification Search
  CPC ...... B60W 50/14; B60W 50/08; B60W 50/10; G05D 1/0088; B60T 7/12; B62D 15/02
  USPC ........................................................ 340/461
  See application file for complete search history.

(56) References Cited

U.S. PATENT DOCUMENTS

| | | | |
|---|---|---|---|
| 8,527,542 B2 | 9/2013 | Haeberle et al. | |
| 8,850,314 B2 | 9/2014 | Thompson | |
| 10,346,888 B2* | 7/2019 | Nix | B60W 50/08 |
| 2017/0217445 A1 | 8/2017 | Tzirkel-Hancock et al. | |
| 2018/0309711 A1 | 10/2018 | Woo et al. | |

* cited by examiner

*Primary Examiner* — Toan N Pham
(74) *Attorney, Agent, or Firm* — Medley, Behrens & Lewis, LLC

(57) ABSTRACT

An autonomous vehicle including a sensor system that outputs a sensor signal indicative of a condition of the autonomous vehicle. The vehicle also includes a user interface device with a display. A computing system determines, based upon a profile of the passenger, that support is to be provided textually to the passenger when the support is provided to the passenger. The computing system further detects occurrence of an event that has been identified as potentially causing discomfort to the passenger. The computing system yet further sets a predefined support message defined in an account corresponding to the event maintained in a database prior to occurrence of the event as a support message to be presented to the passenger. The computing system additionally causes the display to present the support message textually, wherein the textual support message solicits feedback from the passenger of the autonomous vehicle.

20 Claims, 9 Drawing Sheets

CONTEXTUAL AUTONOMOUS VEHICLE SUPPORT THROUGH WRITTEN INTERACTION

BACKGROUND

An autonomous vehicle is a motorized vehicle that can operate without a human driver. Since an autonomous vehicle lacks a human driver, a passenger is typically unable to quickly convey information concerning a request for support. For instance, if a passenger of an autonomous vehicle desires to stop and exit the autonomous vehicle but is generally unfamiliar with an interface in the autonomous vehicle through which such a command can be issued, he or she is unable to directly communicate with a driver to convey this request since the autonomous vehicle lacks a driver. Instead, some conventional approaches for requesting support while in an autonomous vehicle rely on the passenger contacting a support agent via a user interface device. For instance, some traditional approaches involve the passenger describing an event during a ride in the autonomous vehicle (e.g., the autonomous vehicle is in traffic and the passenger desires to exit the autonomous vehicle, the autonomous vehicle is stopped for a reason unknown to the passenger) as part of a voice call initiated by the passenger. However, it may be time consuming for a passenger to initiate the voice call and describe the event. Further, such conventional approaches may be particularly difficult for passengers who have hearing impairments.

SUMMARY

The following is a brief summary of subject matter that is described in greater detail herein. This summary is not intended to be limiting as to scope of the claims.

Described herein are various technologies pertaining to providing a support message to a hearing-impaired passenger of an autonomous vehicle. With more specificity, the various technologies present the support message to the passenger based on a profile of the passenger. The profile of the passenger can specify that the support message is to be provided textually to the passenger (e.g., the passenger may have a hearing impairment). With yet more specificity, the various technologies present the support message when an event that has been identified as potentially causing discomfort to the passenger has been detected. Content of the support message is based on the type of event and is designed to elicit feedback from the passenger. More specifically, the content of the support message is indicative of the type of content a passenger would use when requesting support for the event. The passenger can then select the presented support message to receive an answer to the support message and/or start a written chat session with a support agent or a digital assistant. Because the passenger can select the presented support message relevant to the detected event, the passenger need not navigate about the user interface device to manually enter a support request.

In one example, the autonomous vehicle includes a sensor system that outputs a sensor signal indicative of a condition of the autonomous vehicle and a user interface device including a display that presents a user interface to the passenger. A computing system in the autonomous vehicle detects occurrence of an event during a ride in the autonomous vehicle (e.g., a hard stop in the autonomous vehicle, the autonomous vehicle being stopped for an extended period of time) based on the sensor signal output from the sensor system. The computing system can further cause a predefined support message (or predefined support messages) that is contextually relevant to the detected event to be displayed via the user interface device to the passenger. The predefined support message can be defined in an account corresponding to the event maintained in a database prior to the event happening. The computing system can yet further receive feedback from the passenger; the feedback can be a selection of one or more of the predefined support messages displayed via the user interface device (e.g., the passenger can select a predefined support message presented on the user interface device via a touchscreen display). The computing system can then provide a response textual support message with content based on the selected textual support message and/or establish a communication channel for a written chat session with a support agent or a digital assistant.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
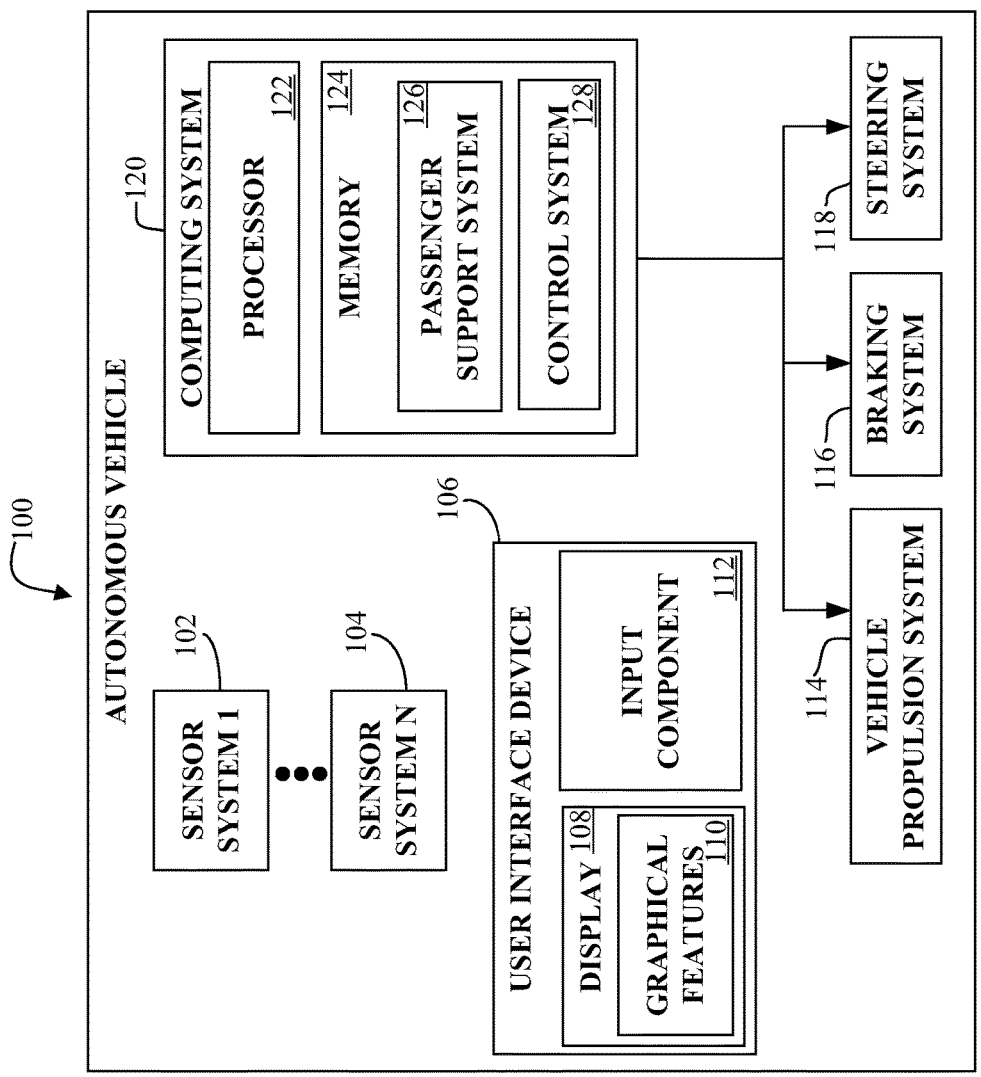
FIG. 1 illustrates an exemplary autonomous vehicle.

Various technologies pertaining to contextual autonomous vehicle support through written interaction are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Disclosed are various technologies that provide a written automated support message to a passenger of an autonomous vehicle that is contextually relevant to a detected event that occurs during a trip in the autonomous vehicle. The techniques set forth herein are particularly well-suited for use when a passenger of an autonomous vehicle has a hearing impairment. More specifically, a computer-readable profile of a passenger can indicate that the passenger prefers to receive a support message(s) textually. When an event is detected that may cause the passenger to be uncomfortable when riding in the autonomous vehicle (such as an atypically quick stop, abnormally fast or slow acceleration, remaining stationary for longer than the passenger may expect), the autonomous vehicle can cause a textual support message to be presented to the passenger. The support message may ask the passenger whether support is desired, inform the passenger of circumstances that cause the event, and so forth. Hence, the passenger need not attempt to navigate a human-machine interface (HMI) to try and contact support while describing the situation.

Accordingly, sensed events on a trip in an autonomous vehicle can trigger written interaction with support for a passenger who has a hearing impairment. While the techniques set forth herein are described for use with passengers having hearing impairments, it is to be appreciated that these techniques can be utilized to assist passengers having other types of disabilities; thus, as noted herein, personalization settings in a profile of a passenger can indicate a preference for written communication for contextual support that is triggered based on detected events occurring when the passenger is in the autonomous vehicle. Moreover, different sensed events, for instance, can trigger different types of written interaction (e.g., a first type of sensed event can trigger predefined support message(s) to be presented to the passenger while a second type of sensed event can trigger establishing a written chat session with a support agent). Pursuant to an illustration, a hard stop in an autonomous vehicle can trigger predefined support messages such as "I'm Feeling Sick" and "How Do I Stop The Car" to be displayed to the passenger; these predefined support messages can be selectable by the passenger to obtain additional information, begin a written chat session with support (e.g., a support agent, a digital assistant), or the like.

With reference now to FIG. 1, an exemplary autonomous vehicle 100 is illustrated. The autonomous vehicle 100 can navigate about roadways without a human driver based upon sensor signals output by sensor systems of the autonomous vehicle 100. The autonomous vehicle 100 includes a plurality of sensor systems, namely, a sensor system 1 102, . . . , and a sensor system N 104 (collectively referred to herein as sensor systems 102-104). The sensor systems 102-104 are of different types and may be arranged about the autonomous vehicle 100. For example, the sensor system 1 102 may be a lidar sensor system and the sensor system N 104 may be a camera (image) system. Other exemplary sensor systems included in the sensor systems radar sensor systems, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include, but are not limited to, a vehicle propulsion system 114, a braking system 116, and a steering system 118. The vehicle propulsion system 114 may be an electric motor, an internal combustion engine, or the like. The braking system 116 can include an engine brake, brake pads, actuators, and/or any other suitable componentry that is configured to assist in decelerating the autonomous vehicle 100. The steering system 118 includes suitable componentry that is configured to control the direction of the movement of the autonomous vehicle 100.

The autonomous vehicle 100 yet further includes a user interface device 106 that may be configured for use by a passenger of the autonomous vehicle 100. The user interface device 106 includes a display 108, whereupon graphical features 110 may be presented. For instance, a graphical user interface (GUI) may be presented as part of the graphical features 110. The user interface device 106 further includes an input component 112 suitable for data input (e.g., touchscreen, mouse, keyboard, trackpad, trackwheel, etc.).

The autonomous vehicle 100 additionally comprises a computing system 120 that is in communication with the sensor systems 102-104, the user interface device 106, the vehicle propulsion system 114, the braking system 116, and/or the steering system 118. The computing system 120 includes a processor 122 and memory 124 that includes computer-executable instructions that are executed by the processor 122. In an example, the processor 122 can be or include a graphics processing unit (GPU), a plurality of GPUs, a central processing unit (CPU), a plurality of CPUs, an application-specific integrated circuit (ASIC), a microcontroller, or the like.

The memory 124 includes a control system 128 configured to control operation of the vehicle propulsion system 114, the braking system 116, and/or the steering system 118. The memory 124 further includes a passenger support system 126 that may be configured to provide support to the passenger riding in the autonomous vehicle 100. More particularly, the passenger support system 126 can provide textual support messages when an event is detected that may cause the passenger to be uncomfortable when riding in the autonomous vehicle.

With respect to the passenger of the autonomous vehicle 100, the passenger support system 126 is configured to receive preference data for the passenger that is stored in a computer-readable profile of the passenger. The preference data indicates that 1) support is to be initiated for the passenger upon detection of an event that may cause the passenger discomfort; and 2) that the support is to be conducted textually. In an example, the passenger may have a hearing impairment, and the passenger can define the preference data in his or her profile.

While the passenger is in the autonomous vehicle 100, the passenger support system 126 is configured to detect an event based upon sensor signals output by the sensor systems 102-104, wherein the event is previously identified as potentially causing discomfort to passengers of autonomous vehicles 100. Exemplary events that can be detected by the passenger support system 126 include, but are not limited to, a hard stop (e.g., deceleration above a threshold), a sudden turn (e.g., direction change rate above a threshold), a traffic jam (e.g., velocity below a threshold velocity for an extended threshold period of time), the autonomous vehicle 100 being stopped for a reason that may be unclear to the passenger, and so forth.

Responsive to the passenger support system 126 detecting such an event, the passenger support system 126 is configured to cause the display 108 to present a textual support message (in accordance with the preferences of the passenger), as will be described in detail below. The support message can include a prompt for response, may be informative as to the detected event, may include instructions for the passenger to follow, may initiate a written chat session with a support agent, and so forth. The passenger can then interact with the support message by selecting it on the display 108. Exemplary operation of the passenger support system 126 is set forth below.

The autonomous vehicle 100 may suddenly stop (e.g., due to an animal running in front of the autonomous vehicle 100 or a vehicle in front of the autonomous vehicle 100 coming to a sudden stop). The sensor systems 102-104 output sensor signals that indicate the autonomous vehicle 100 has suddenly stopped (e.g., rate of deceleration is above a threshold). The passenger support system 126 determines that the event (the sudden stop) has occurred based upon the sensor signals and causes the display 108 to present a textual support message, such as "I am hurt", "why did the vehicle stop", "are you ok", "initiate chat", and so forth. Hence, support is automatically initiated for the passenger, and the passenger need not navigate about the user interface device 106 in an attempt to enter support request information.

In another example, the sensor system 102-104 can output sensor signals that indicate that the autonomous vehicle 100 has not moved for a relatively significant amount of time (e.g., three minutes). The passenger support system 126 detects that the autonomous vehicle 100 has not moved based upon the sensor signals and causes the display 108 to present a textual support message in accordance with the profile of the passenger. Again, such support message can be a prompt for the passenger, may be informative as to the detected event, etc. For instance, the support message may be "I don't know what is going on, please explain", "initiate chat", "there is an accident on E.55$^{th}$ street causing a ten minute delay", and so forth. Again, the passenger support system 126 is particularly well-suited for allowing the passenger to avoid having to navigate about the user interface device 106 to manually enter a support request while attempting to obtain support.

Once support is initiated, the passenger may provide feedback that is received by the user interface device 106 and is provided to the passenger support system 126. The passenger may provide feedback by selecting the support message that is presented on the display 108. For instance, where the display 108 is a touchscreen, the passenger can provide feedback by touching the portion of the display 108 presenting the support message. The passenger support system 126 can then provide support in accordance with the received feedback and it may set forth additional (textual) support messages, etc.

Figure 2:
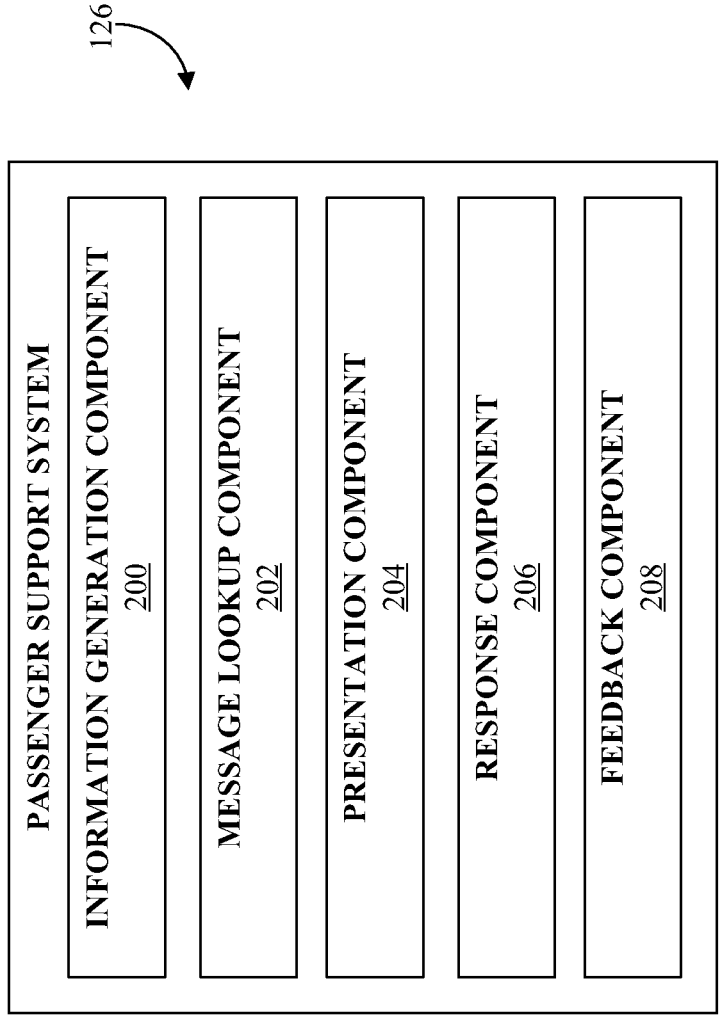
FIG. 2 is a functional block diagram of a passenger support system.

As shown in FIG. 2, the passenger support system 126 includes an information generation component 200, a message lookup component 202, a presentation component 204, a response component 206, and/or a feedback component 208.

The information generation component 200 is configured to receive status data signifying physical condition of the autonomous vehicle 100 based upon sensor signals output by the sensor systems 102-104. The information generation component 200 is further configured to generate information data when the information generation component 200 detects an event based on the status data, the event being previously identified as potentially causing discomfort to passengers of the autonomous vehicle 100. The information generation component 200 is yet further configured to transmit the information data to the message lookup component 202. The information data signifies the type of event that has occurred.

The status data can include velocity of the autonomous vehicle 100, direction of the autonomous vehicle 100, elevation of the autonomous vehicle 100, location of the autonomous vehicle 100, or the like. The status data can further include present physical condition of the autonomous vehicle 100, physical conditions of the autonomous vehicle 100 over a period of time, a historical physical condition of the autonomous vehicle 100, or the like. For example, the status data can signify a current velocity of the autonomous vehicle 100. In another example, where the status data includes physical conditions of the autonomous vehicle 100 over a period of time, the data can signify the rate of change in velocity of the autonomous vehicle 100 during that period of time.

The message lookup component 202 can, responsive to receipt of the information data from the information generation component 200, access a database to obtain a predefined support message associated with the event signified by the information data. The predefined support message is stored in the database in an account corresponding to the event. The predefined support message is defined in the database prior to the event occurring. For example, a third party may associate a specific support message with a specific event in the database prior to the event occurring. It is also contemplated that the predefined support message can be updated (e.g., the account of the event can be updated to modify or add a predefined support message). The database can comprise a part of a data store in the autonomous vehicle 100 or may be part of a separate server system.

The predefined support message is stored in the database in the account corresponding to the event. The database may comprise a plurality of accounts, each corresponding to different events. For instance, there can be one account for "hard stops" (e.g., deceleration rate above a threshold) and another account for traffic jams (e.g., velocity of the autonomous vehicle 100 below a threshold velocity for an extended threshold period of time). Each of the plurality of accounts includes at least one predefined support message.

The number of predefined support messages in each account for an event may depend on the type of event the account is associated with. For instance, where the event is a car accident (e.g., fender bender), the account for that event may include a plurality of different predefined support messages. Whereas, where the event is a "hard stop" (e.g., a deceleration rate above a certain threshold), the account for that event may include a single predefined support message.

The content of the predefined support message can include a word, a number, a phrase, or any combination thereof. The content of the predefined support message may be indicative of possible content the passenger would enter while requesting support. For example, the content of the support message can comprise the word "stop". In another example, the content of the support message can comprise the phrase "I am hurt". In one embodiment, content of the support message is based on the type of event that has occurred or is occurring as signified by the information data.

The content of the predefined support message can be further configured to elicit an input (e.g., selection of the support message once presented to the passenger) from the passenger. For example, the content can comprise a question or a request for a passenger to select a support message from amongst a plurality of different support messages. In one example, the content of the predefined support message comprises a question that a passenger would conventionally manually enter into the user interface device 106 while seeking support. Once the predefined support message is presented to the passenger, as described in detail below, the passenger can then select the support message, i.e. provide input, instead of having to manually enter it. In another embodiment, the content of the predefined support message includes a plurality of choices the passenger can select one or more of. The passenger can then provide input by selecting one or more of the choices as desired. This may allow a passenger to avoid navigating about the user interface device 106 to manually enter a support request.

In an alternative, the message lookup component 202 can be configured, responsive to receiving the information data from the information generation component 200, to interact with a computer implemented machine learning model to generate a support message based on the received information data. As will be described in greater detail below, the machine learning model is configured to facilitate generation of a support message based upon the received information data. In an embodiment, the machine learning model may be a recurrent neural network (RNN). In yet another embodiment, the machine learning model may be or include a variational autoencoder (VAE).

In an example, the machine learning model may comprise nodes and edges that couple nodes in the machine learning model. For instance, the machine learning model may be an artificial neural network (ANN), a Bayesian model, a deep neural network (DNN), or the like. In another example, the machine learning model may be or include a support vector machine (SVM), a naïve Bayes classifier, or other suitable classifier. When the machine learning model comprises nodes and edges, each edge is assigned a learned weight, wherein the weight can be learned using a supervised, semi-supervised, or unsupervised learning procedure. Accordingly, for instance, a weight assigned to an edge can be influenced by content of information data received and passenger information (e.g., influenced by an age of the passenger, a gender of the passenger, etc.). The message lookup component 202 may provide information data to the machine learning model as input, and the machine learning model may generate a support message(s) based upon the input and the weights assigned to the edges, wherein the generated support message(s) can be configured to represent a support request the passenger would conventionally manually enter into the user interface device 106.

The message lookup component 202 is further configured to transmit message data to the presentation component 204. The message data signifies the predefined and/or generated support message(s) associated with the type of event that has occurred.

The presentation component 204 can, responsive to receipt of the message data from the message lookup component 202, present the support message to the passenger of the autonomous vehicle 100. The presentation component 204 presents the content of the support message to the passenger in the manner specified by the passenger in the received preference data. In the following embodiments, the preference of the passenger is to present the support message textually. In one embodiment, the presentation component 204 is configured to present the support message to the passenger by way of the display 108 on the user interface device 106. In another embodiment, the presentation component 204 is configured to present the support message to the passenger by way of a display of a mobile computing device operated by the passenger. Any suitable display for the textual support message is hereby considered.

For example, in an embodiment, the display 108 of the user interface device 106 can be configured to present the textual support message to the passenger in a graphical format, for instance by way of a widget. As used herein, a widget is an interface element with which a computer user interacts in a GUI, such as a window or a text box. Generally, a widget displays information or provides a specific way for a user to interact with the operating system and/or application. In an embodiment, the widget comprises a selectable icon displaying the textual support message. In another embodiment, the widget is configured to display text entered by the passenger into the user interface device 106 via the input component 112. The widget can comprise any suitable mechanism configured for displaying the support message and/or passenger feedback and for inviting, accepting, and/or responding to the passenger's actions.

In one embodiment, the presentation component 204 is configured to present a single widget displaying a single textual support message. In another embodiment, the presentation component 204 is configured to present a plurality of different widgets each displaying a different textual support message. As noted above, the number of widgets displayed may depend on the event detected and/or the number of support messages signified by the message data from the message lookup component 202.

The response component 206 can be configured to receive the input from the passenger. The input from the passenger can be made responsive to a support message(s) being presented to the passenger or can be made independent of a support message being presented. In one embodiment, the input comprises selection of a widget and/or choice within a widget by the passenger. In another embodiment, the input comprises text entered by the passenger into the user interface device 106 via the input component 112.

In an embodiment, the display 108 of the user interface device 106 comprises a touchscreen and the input from the passenger comprises the passenger touching the part of the touchscreen displaying the widget. In another embodiment, the input from the passenger comprises the passenger using a cursor to click on the part of the display 108 showing the widget. Any suitable method of providing input in response to presentation of the widget is hereby considered.

The response component 206 may be further configured, reactive to receipt of the input from the passenger, to provide a response support message for the passenger. In one embodiment, the response component 206 may be further configured to present one or more response support messages to the passenger. The number of response support messages presented to the passenger may depend on the input received (e.g., the selected widget). Similar to the presentation component 204, described above, the response component 206 may be configured to present the response support message to the passenger according to the received passenger preference. In this instance, the preference of the passenger is textual response support messages.

The response component 206 may be further configured to present the textual response support message to the passenger via a widget on the display 108 of the user interface device 106. The content of the response support message can include a word, a number, a phrase, or any combination thereof. In one embodiment, content of the response support option comprises a statement providing an answer to the input from the passenger. In another embodiment, content of the response support option is configured to elicit further input from the passenger.

The response component 206 may be yet further configured to transmit response data to the control system 128 to control the autonomous vehicle 100. The response data can indicate input from the passenger of a desire to change operation of the autonomous vehicle 100. For instance, the displayed textual support message can read "STOP" or "STOP CAR" and the passenger selects, providing input, when the passenger wants the autonomous vehicle 100 to pull over and stop directional movement.

Figure 3:
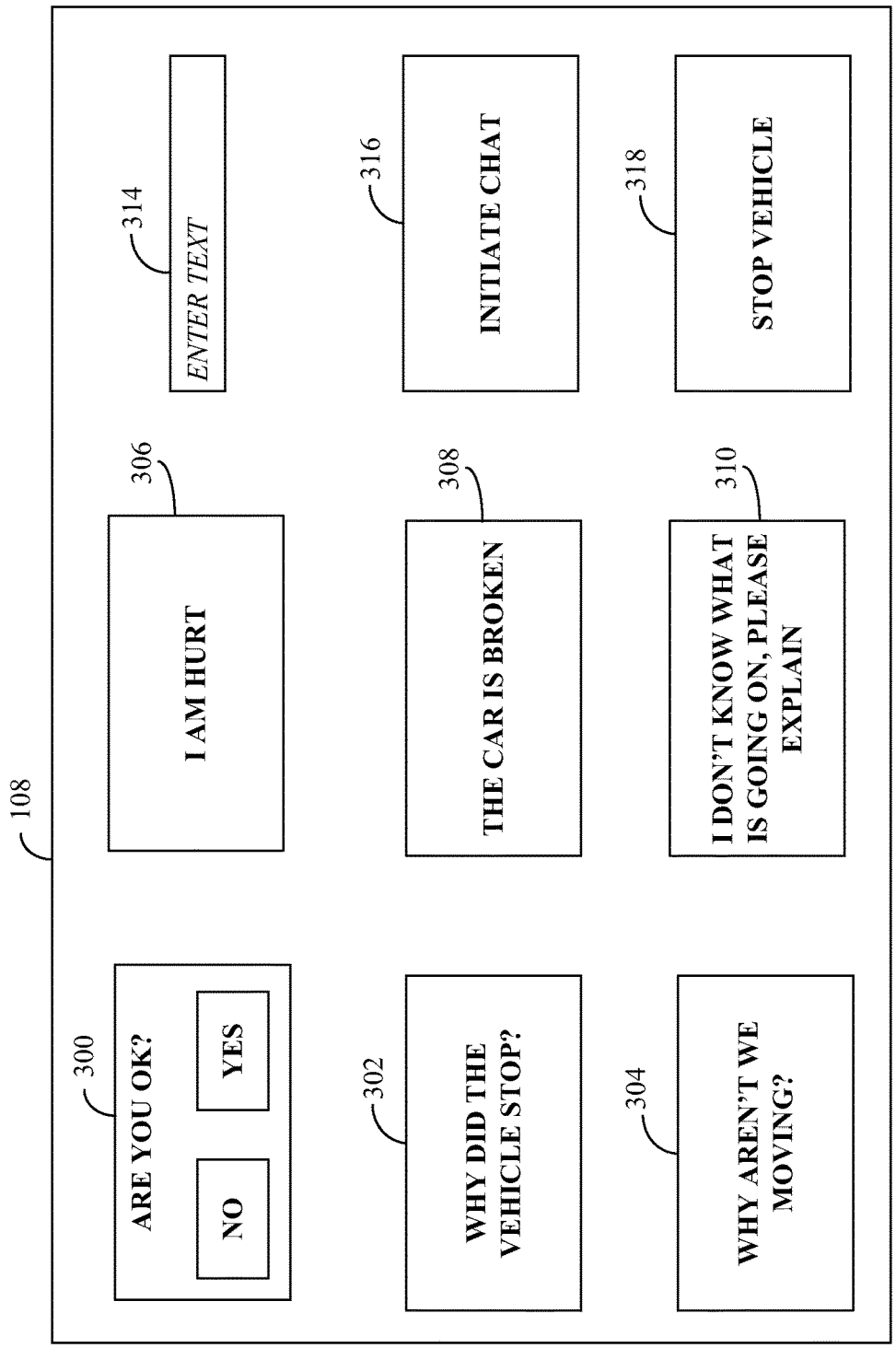
FIG. 3 illustrates exemplary support messages.

FIG. 3 illustrates examples of different widgets (e.g., the graphical features 110) that can be presented as part of a graphical user interface on the display 108 via the presentation component 204. As discussed above, the presentation component 204 can be configured to cause one or more of the illustrated examples to be displayed simultaneously responsive to a detected event occurring during a trip in an autonomous vehicle. Each of the different widgets can be configured to receive their own input from the passenger. The passenger may provide input to one or more of the different widgets as desired.

In one embodiment, the content of the support message displayed by the widget may be similar for a plurality of different events. For example, the presentation component 204 may display widget 300 and/or widget 306 when the event is a velocity change rate above a certain threshold (e.g., a hard stop), an elevation change rate above a certain threshold (e.g. went down a steep hill), a direction change rate above a certain threshold (e.g., swerving), and/or any situation where the autonomous vehicle 100 makes a sudden maneuver. The content of the support message displayed by widget 300 comprises text stating "ARE YOU OK?" and includes two separate selectable choices stating "NO" and "YES" respectively. Widget 300 may give the passenger the message to easily indicate an issue by selecting "NO". Widget 306 displays the support message "I AM HURT" and the passenger can select widget 306 when the passenger is injured.

In another example, the content of the support message displayed by widget 308 comprises text stating "THE CAR IS BROKEN" and may be presented when the event is the autonomous vehicle 100 not operating correctly and/or malfunctioning, for instance smoke is coming out of the vehicle propulsion system 114, the autonomous vehicle 100 is not moving, the autonomous vehicle 100 has a flat tire, or the like.

In another embodiment, the content of the support message displayed by the widget may be more specific to the event. For example, the content of the support message displayed by widget 302 is "WHY DID THE VEHICLE STOP" and may be presented when the event is the autonomous vehicle 100 making a non-routine stop. For instance, when the autonomous vehicle 100 pulls over at a location other than a drop-off location for the passenger, the presentation component 204 may present widget 302. In another example, the content of the support message displayed by widget 304 comprises text stating "WHY AREN'T WE MOVING?" and may be presented when the event is the autonomous vehicle 100 not moving for a set period of time and is not a part of a traffic jam.

In yet another embodiment, the presentation component 204 may present a widget(s), in addition to the widgets described above, with generic content. For example, widget 310 displays "I DON'T KNOW WHAT IS GOING ON, PLEASE EXPLAIN" and the passenger may select this widget when the passenger is not able to readily identify a possible situation while the passenger rides in the autonomous vehicle 100 (e.g., the autonomous vehicle 100 is in a traffic jam). In another example, widget 318 displays "STOP VEHICLE" and the passenger may select this widget whenever the passenger wants to the autonomous vehicle 100 to pullover to a side of a road and stop movement. In a further example, widget 316 displays "INITIATE CHAT" and the passenger may select this widget when the passenger wants to start a written chat session with support, as will be described in detail below. In a yet further example, widget 314 comprises a text box configured to display text entered by the passenger via the input component 112. The text entered by the passenger can comprise a query and/or a support request.

Figure 4:
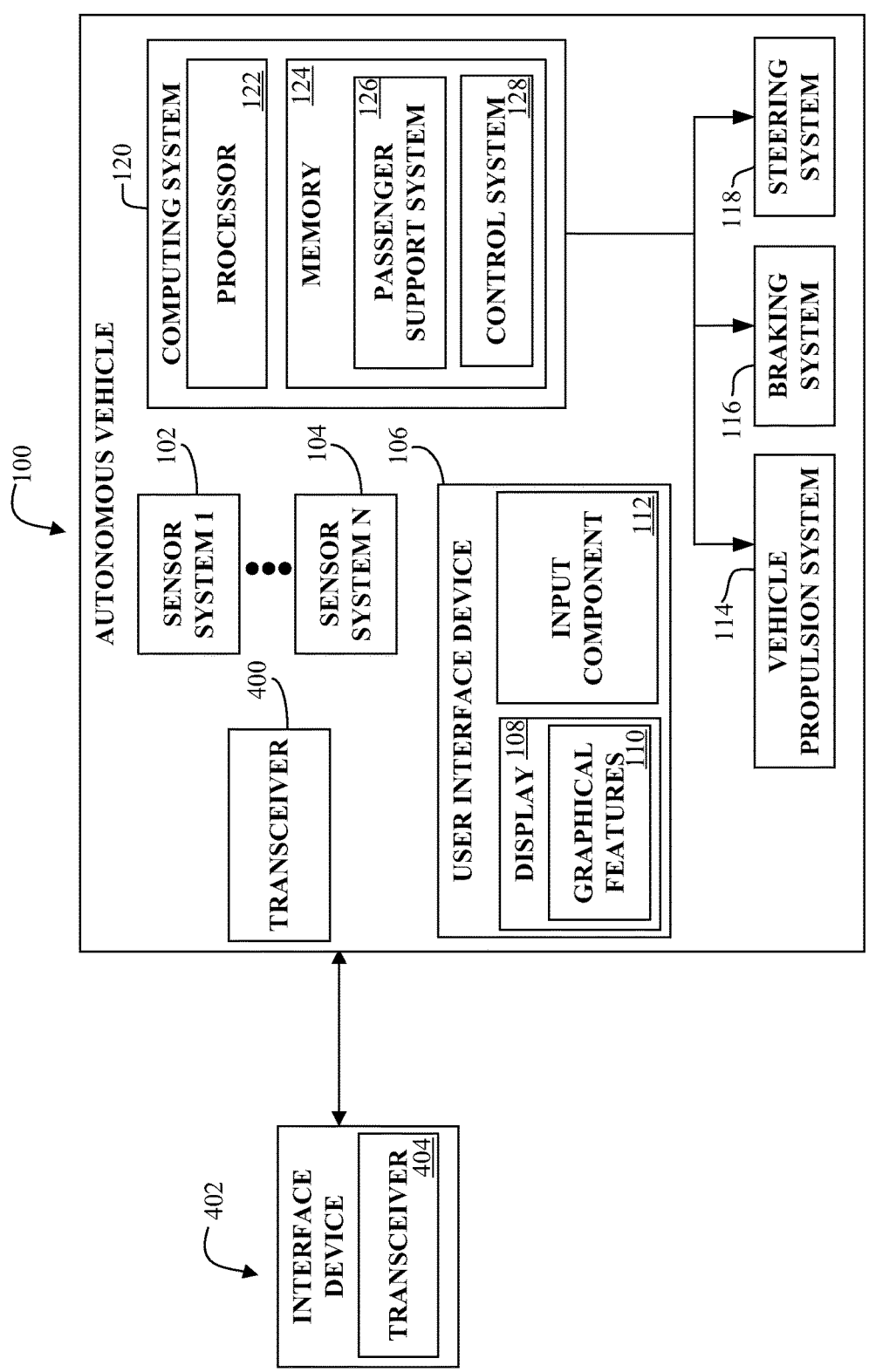
FIG. 4 illustrates an exemplary autonomous vehicle in communication with an interface device.

Turning now to FIG. 4, the passenger support system 126 can further be configured to establish a communication channel between the passenger and a second interface device 402 operated by a support agent (e.g., a person who provides support to the passenger) to exchange support data. The second interface device 402 has an application installed on it that allows for the application and the passenger support system 126 to establish the communication channel. The passenger support system 126 may be further configured to receive messages transmitted from the second interface device 402 via the communication channel.

As shown in FIG. 4, in order to establish the communication channel, the autonomous vehicle 100 may include a transceiver 400. The transceiver 400 is configured to transmit data from the autonomous vehicle 100 and/or receive data at the autonomous vehicle 100. Thus, the autonomous vehicle 100 can exchange data with the second interface device 402. Similarly, the second interface device 402 includes a transceiver 404 configured to transmit data from the second interface device 402 and/or receive data at the second interface device 402. The passenger support system 126 can then be configured to present the data received from the second interface 402 to the passenger in a suitable manner according to the preference of the passenger (e.g., widget, text in a chat box).

The data transmitted from the autonomous vehicle 100 to the second interface device 402 can provide the support agent with information regarding the input from the passenger. The data can signify the content from the selected widget, text manually entered into the user interface device 106, and/or any suitable information the support agent of the second interface device 402 may need.

In one embodiment, the communication channel is established with a second interface device 402 operated by support agent. In another embodiment, the passenger can be placed in communication with a digital assistant (in addition to or instead of the support agent). The passenger support system 126 may be configured to select a specific support agent (from a set of support agents) based on a user preference of the passenger, the content of the support message selected, and/or content of input. For example, where the passenger is hearing-impaired, the user preference of the passenger may be for the user to have experience assisting the hearing-impaired. Similar to the support message discussed above, the user preference of the passenger can be stored in a database in an account associated with the passenger and can be provided by any suitable source.

The passenger support system 126 can be configured to establish a written chat session between the passenger and support agent that can be displayed on the display 108 as a chat box. The passenger may manually enter text that will be sent to the second interface device 402 via the input component 112. For example, the passenger can enter a desired message into the chat box and then a separate command to transmit the whole text message from the user interface device 106 to the second interface device 402. In another example, as each alphanumeric character is entered by the passenger they are transmitted to the second interface device 402 where they are displayed (e.g., as the passenger enters the letter "A" the passenger support system 126 transmits the letter "A" to the second interface device 402).

Figure 5:
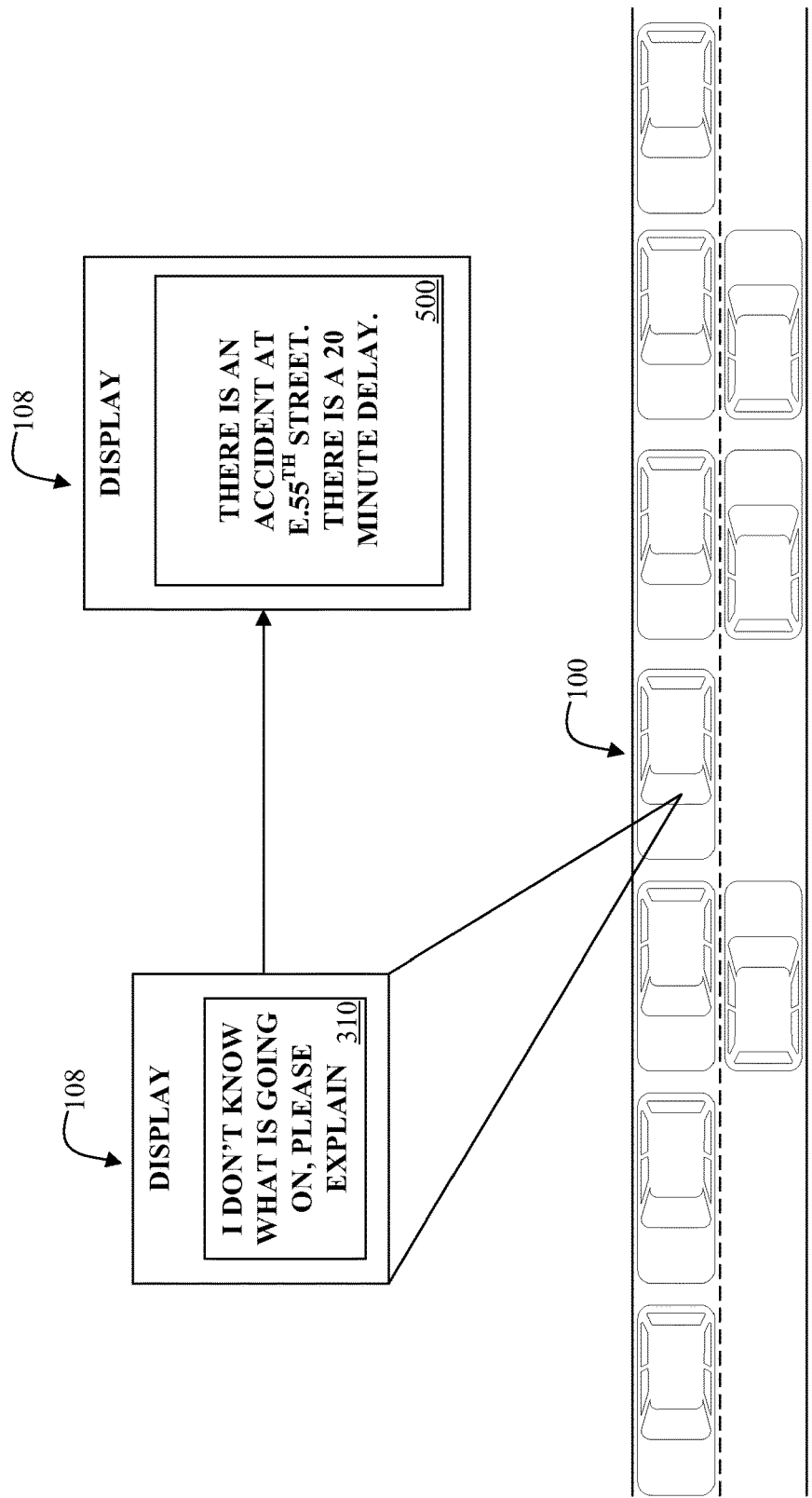
FIG. 5 illustrates an example of providing a support message to a passenger of an autonomous vehicle.
Figure 6:
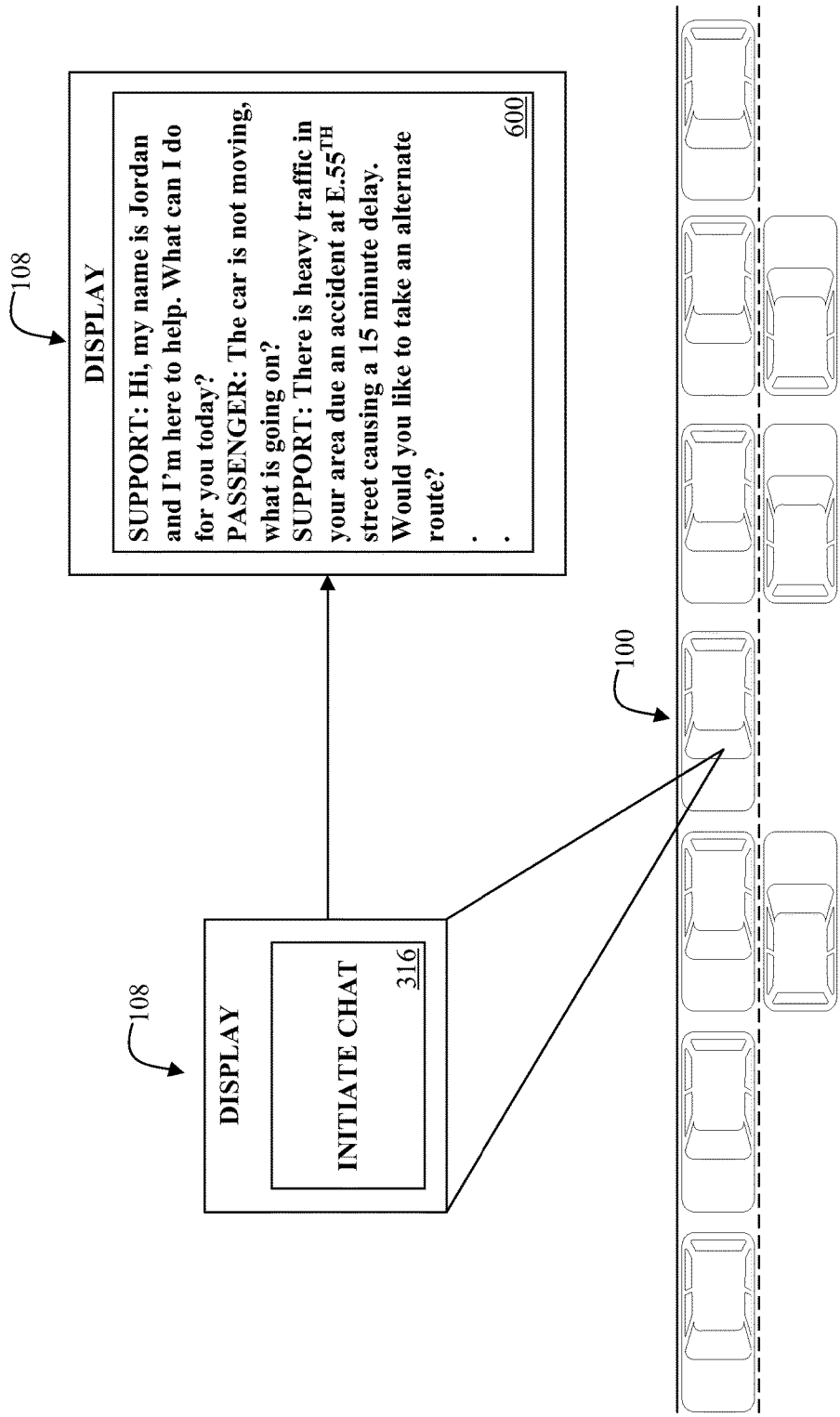
FIG. 6 illustrates another example of providing a support message to a passenger of an autonomous vehicle.

FIGS. 5 and 6 illustrate exemplary examples of the autonomous vehicle 100 described above providing support to a passenger of the autonomous vehicle 100. FIGS. 5 and 6 illustrate the autonomous vehicle 100 sitting in traffic congestion. The information generation component 200 receives status data from the sensor systems 102-104 signifying that the autonomous vehicle 100 has not moved for a set period of time.

In FIG. 5, the passenger support system 126 presents widget 310 stating "I DON'T KNOW WHAT IS GOING ON, PLEASE EXPLAIN" to the passenger via the display 108 of the user interface device 106. The passenger can then provide input by selecting widget 310 on the display 108. Responsive to the passenger support system 126 receiving this input, the passenger support system 126 can then presents a response support message. In the illustrated embodiment, the passenger support system 126 presents widget 500 which contains text informing the passenger of the reason for the traffic jam and the expected duration of the delay.

In FIG. 6, the passenger support system 126 presents widget 316 stating "INITIATE CHAT" to the passenger via the display 108 of the user interface device 106. The passenger can then provide input by selecting widget 316 on the display 108. Responsive to the passenger support system 126 receiving this input, the passenger support system 126 can establish a communication channel with a second interface device 402, as described above. The passenger support system 126 can be further configured to inform the passenger, via the display 108, that a written chat session is being initiated, for instance by displaying "INITIATING CHAT" or a suitable icon on the display 108. Once the communication channel with the second interface device 402 is established, the passenger support system 126 can be configured to present a widget 600 which comprises a chat box to show (textually) the written chat session between the passenger and the support agent.

The passenger support system 126 may be further configured to present a feedback message to the passenger to obtain passenger feedback about the ride in the autonomous vehicle 100. Similar to the presentation component 204, described above, the feedback component 208 may be configured to present the feedback message to the passenger according to the received passenger preference. In this instance, the preference of the passenger is textual feedback messages.

Figure 7:
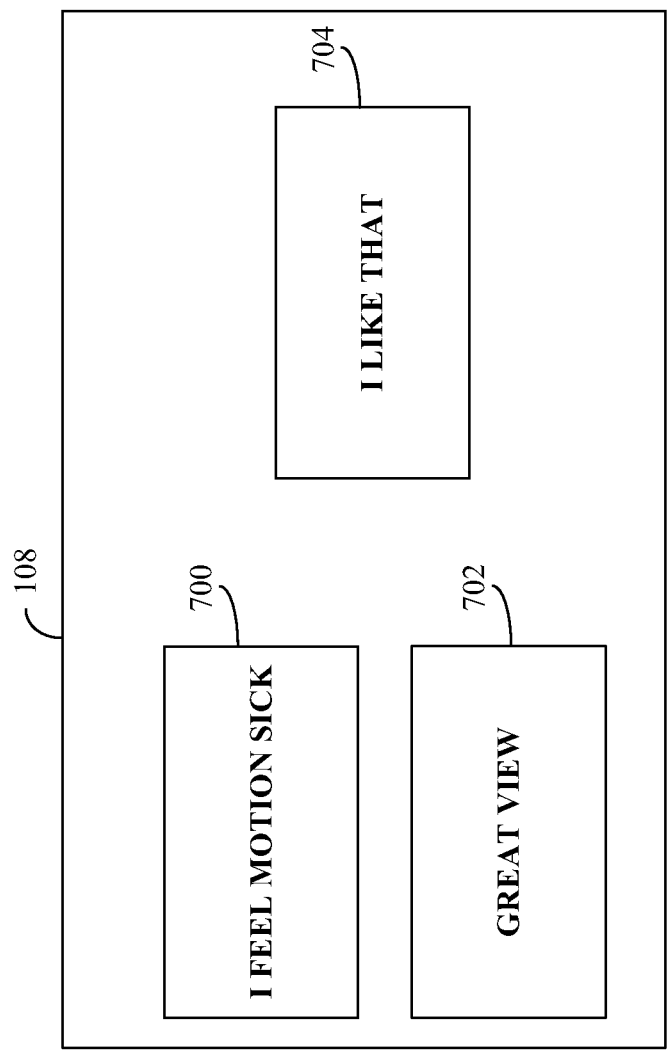
FIG. 7 illustrates exemplary feedback messages.

For example, the feedback component 208 can present the textual feedback message in a widget on the display 108 of the user interface device 106. The widget would include content configured to elicit feedback from the passenger regarding the trip in the autonomous vehicle 100. The feedback component 208 can be further configured to present the widget independent of generation of information data by the information generation component 200 (i.e. the widget would always be displayed). FIG. 7 illustrates exemplary widgets that can be presented on the display 108 via the feedback component 208. The widgets can be provided with different text to signify different feedback messages. For example, widget 700 displays text stating "I FEEL MOTION SICK" while widget 702 displays text stating "I LIKE THAT" and widget 704 displays text stating "GREAT VIEW". The passenger would supply input to the passenger support system 126 by selecting one or more of the feedback messages as so desired.

Figure 8:
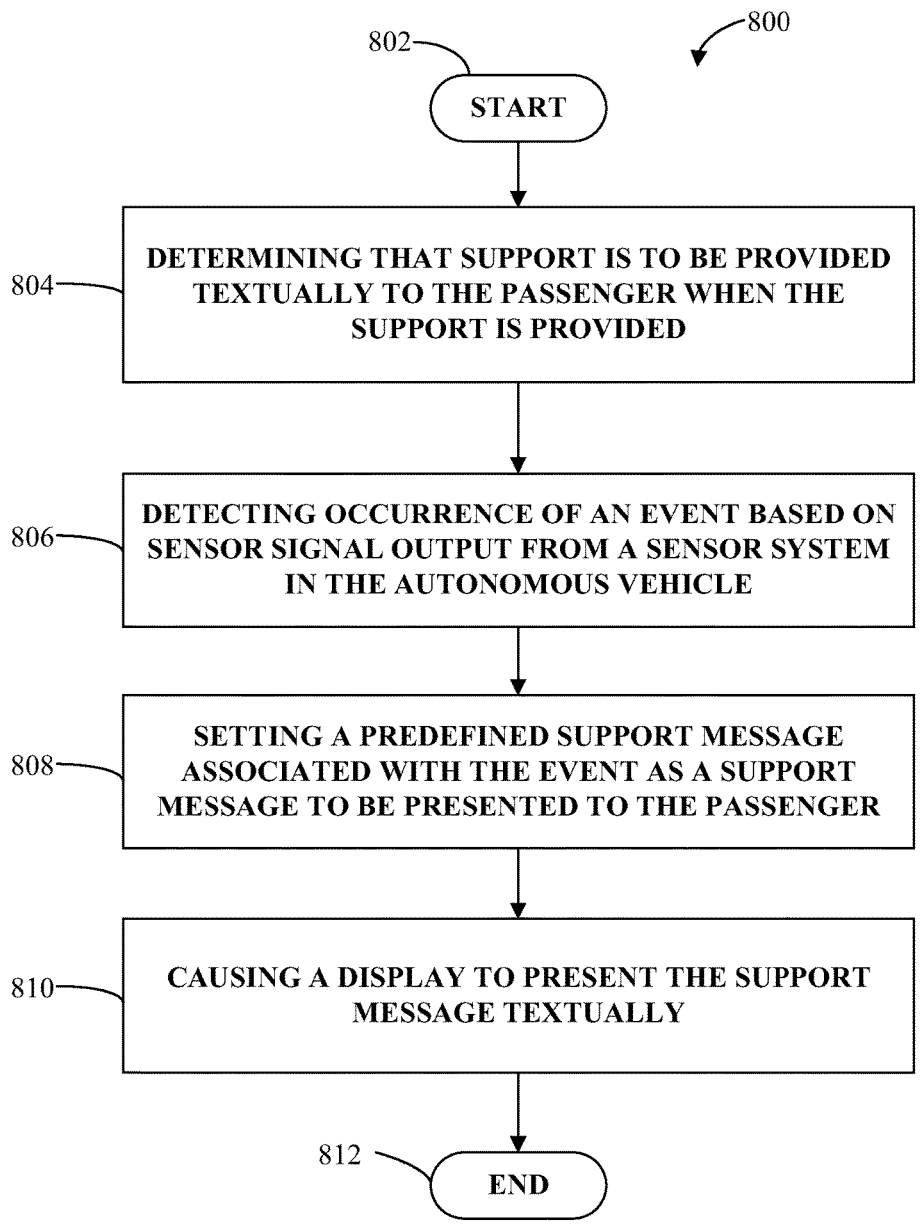
FIG. 8 is a flow diagram that illustrates an exemplary methodology executed by an autonomous vehicle computing system.

FIG. 8 illustrates an exemplary methodology relating to providing a support message for a passenger of an autonomous vehicle. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

Referring now to FIG. 8, an exemplary methodology 800 is illustrated. The methodology 800 starts at 802, and at 804, a processor determines, based upon a profile of a passenger of an autonomous vehicle, that support is to be provided textually to the passenger when support is provided to the passenger. At 806, the processor detects occurrence of an event based upon sensor signal output from a sensor system in the autonomous vehicle. The sensor signal output indicates a condition of the autonomous vehicle. The event having been identified as potentially causing discomfort to the passenger. At 808, the processor sets a predefined support message associated with the event as a support message to be presented to the passenger. The predefined support message is defined in an account corresponding to the event maintained in a database prior to occurrence of the event. At 810, the processor causes, in accordance with the profile of the passenger, a display to present the support message textually. The textual support message further solicits feedback from the passenger of the autonomous vehicle. Methodology 800 concludes at 812.

In an embodiment, the methodology 800 further includes receiving feedback from the passenger in response to presentation of the support message. In this embodiment, the display is a touchscreen and the passenger provides feedback by touching a portion of the touchscreen displaying the support message. In one version of the embodiment, the processor then causes the display to present a response textual support message. The content of the response support message is based on the feedback received (i.e. the support message selected). In another version of this embodiment, the processor establishes communication channel between the autonomous vehicle and an interface device operated by a support agent. The processor can then cause the display to present a chat box that displays communication exchanged over the communication channel between the passenger and the support agent.

In another embodiment of methodology 800, the account data for the event includes a plurality of predefined support messages. The processor sets the plurality of predefined support messages as a plurality of support messages to be presented to the passenger. The processor then causes the display to present the plurality of support messages textually. The processor receives feedback when the passenger touches a portion of the touchscreen display presenting one support message of the plurality of support messages.

In a yet further embodiment, the methodology 800 further includes controlling the autonomous vehicle based on the received feedback. For instance, the processor can control the vehicle propulsion system, braking system, and/or steering system to adjust the autonomous vehicle (e.g., stopping to allow the passenger to exit the vehicle).

Figure 9:
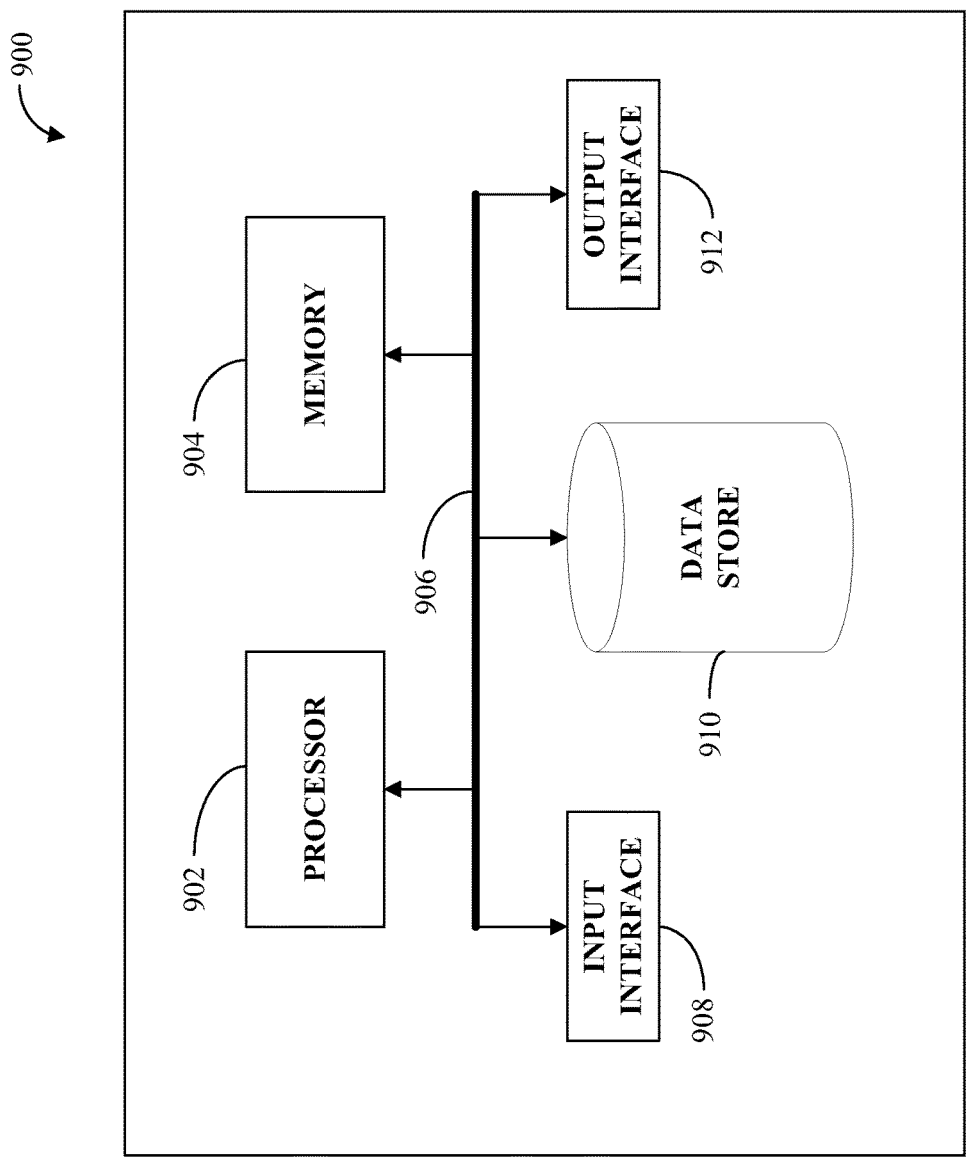
FIG. 9 illustrates an exemplary computing system.

Referring now to FIG. 9, a high-level illustration of an exemplary computing device that can be used in accordance with the systems and methodologies disclosed herein is illustrated. For instance, the computing device 900 may be or include the mobile computing device or the computing system. The computing device 900 includes at least one processor 902 that executes instructions that are stored in a memory 904. The instructions may be, for instance, instructions for implementing functionality described as being carried out by one or more components discussed above or instructions for implementing one or more methods described above. The processor 902 may be a GPU, a plurality of GPUs, a CPU, a plurality of CPUs, a multi-core processor, etc. The processor 902 may access the memory 904 by way of a system bus 906. In addition to storing executable instructions, the memory 904 may also store geolocation coordinates of suggested locations or landmarks, roadways, user identification, user preferences, etc.

The computing device 900 additionally includes a data store 910 that is accessible by the processor 902 by way of the system bus 906. The data store 910 may include executable instructions, geolocation coordinates of suggested locations or landmarks, roadways, user identification, user preferences, etc. The computing device 900 also includes an input interface 908 that allows external devices to communicate with the computing device 900. For instance, the input interface 908 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
   a sensor system that is configured to output a sensor signal indicative of a condition of the autonomous vehicle;
   a user interface device that presents a user interface to a passenger of the autonomous vehicle, wherein the user interface device includes a display; and
   a computing system that is in communication with the sensor system and the user interface device, wherein the computing system comprises:
   a processor; and
   memory that stores computer-executable instructions that, when executed by the processor, cause the processor to perform acts comprising:
   determining, based upon a profile of the passenger, that support is to be provided textually to the passenger when the support is provided to the passenger;
   detecting occurrence of an event based upon the sensor signal output by the sensor system, wherein the event has been identified as potentially causing discomfort to the passenger;

responsive to detecting the occurrence of the event, setting a predefined support message associated with the event as a support message to be presented to the passenger, wherein the predefined support message is defined in an account corresponding to the event maintained in a database prior to the occurrence of the event; and causing, in accordance with the profile of the passenger, the display to present the support message textually, wherein the textual support message solicits feedback from the passenger of the autonomous vehicle.

2. The autonomous vehicle of claim 1, the acts further comprising:

responsive to receiving the feedback from the passenger, causing the display to present a textual response support message, wherein content of the textual support message is based on the feedback from the passenger.

3. The autonomous vehicle of claim 1, wherein the predefined support message comprises predefined content selectable by the passenger to enter into the user interface device while requesting support.

4. The autonomous vehicle of claim 1, wherein the account corresponding to the event comprises a plurality of predefined support messages.

5. The autonomous vehicle of claim 4, wherein setting the predefined support message as the support message to be presented to the passenger comprises setting the plurality of predefined support messages as a plurality of support messages to be presented to the passenger, wherein causing the display to present the support message textually comprises causing the display to present the plurality of support messages textually.

6. The autonomous vehicle of claim 1, the acts further comprising:

responsive to receiving the feedback from the passenger, establishing a communication channel between the autonomous vehicle and an interface device operated by a support agent.

7. The autonomous vehicle of claim 6, the acts further comprising:

causing the display to present a chat box which shows textually a written chat session exchanged over the communication channel between the passenger and the support agent.

8. The autonomous vehicle of claim 6, wherein the support agent is selected based upon at least one of the profile of the passenger or content of the feedback.

9. The autonomous vehicle of claim 1, wherein the display comprises a touchscreen, wherein the passenger provides the feedback by touching a portion of the touchscreen displaying the textual support message.

10. A method comprising:

determining, based upon a profile of a passenger of an autonomous vehicle, that support is to be provided textually to the passenger when the support is provided to the passenger;

detecting occurrence of an event based upon sensor signal output from a sensor system in the autonomous vehicle, wherein the sensor signal output is indicative of a condition of the autonomous vehicle, wherein the event has been identified as potentially causing discomfort to the passenger;

responsive to detecting the occurrence of the event, setting a predefined support message associated with the event as a support message to be presented to the passenger, wherein the predefined support message is defined in an account corresponding to the event maintained in a database prior to the occurrence of the event; and causing, in accordance with the profile of the passenger, a display to present the support message textually, wherein the textual support message solicits feedback from the passenger of the autonomous vehicle.

11. The method of claim 10, further comprising:

receiving the feedback from the passenger, wherein the display comprises a touchscreen, wherein the feedback comprises the passenger touching a portion of the touchscreen presenting the textual support message.

12. The method of claim 10, further comprising:

responsive to receiving the feedback from the passenger, causing the display to present a textual response support message, wherein content of the textual response support message is based on the feedback from the passenger.

13. The method of claim 10, further comprising:

responsive to receiving the feedback from the passenger, establishing a communication channel between the autonomous vehicle and an interface device operated by a support agent.

14. The method of claim 13, further comprising:

responsive to establishing the communication channel, causing the display to present a chat box configured to textually display communication exchanged over the communication channel between the passenger and the support agent.

15. The method of claim 10, wherein the account corresponding to the event comprises a plurality of predefined support messages, wherein setting the predefined support message as the support message to be presented to the passenger comprises setting the plurality of predefined support messages as a plurality of support messages to be presented to the passenger, wherein causing the display to present the support message textually comprises causing the display to present the plurality of support messages textually.

16. The method of claim 15, further comprising:

receiving the feedback from the passenger, wherein the display comprises a touchscreen, wherein the feedback comprises the passenger touching a portion of the touchscreen presenting one textual support message of the plurality of textual support messages.

17. The method of claim 10, further comprising:

responsive to receiving the feedback from the passenger, controlling at least one of a vehicle propulsion system, a braking system, or a steering system to control physical condition of the autonomous vehicle based on the received feedback.

18. A computing device, comprising:

a processor; and memory that comprises computer-executable instructions that, when executed by the processor, cause the processor to perform acts including:

determining, based upon a profile of a passenger of an autonomous vehicle, that support is to be provided textually to the passenger when the support is provided to the passenger;

detecting occurrence of an event based upon sensor signal output from a sensor system in the autonomous vehicle, wherein the sensor signal output is indicative of a condition of the autonomous vehicle, wherein the event has been identified as potentially causing discomfort to the passenger;

responsive to detecting the occurrence of the event, setting a predefined support message associated with the event as a support message to be presented to the passenger, wherein the predefined support message is defined in an account corresponding to the event maintained in a database prior to occurrence of the event; and causing, in accordance with the profile of the passenger, a display to present the support message textually, wherein the textual support message solicits feedback from the passenger of the autonomous vehicle.

19. The computing device of claim 18, the acts further comprising:

responsive to receiving the feedback from the passenger, causing the display to present a textual response support message, wherein content of the textual response support message is based on the feedback from the passenger.

20. The computing device of claim 18, the acts further comprising:

responsive to receiving the feedback from the passenger, establishing a communication channel between the autonomous vehicle and an interface device operated by a support agent.

* * * * *